June 1, 1926.  1,586,619
E. T. FERNGREN
METHOD AND APPARATUS FOR SUPPLYING MOLTEN GLASS TO SHEET DRAWING MACHINES
Filed Oct. 12, 1922   2 Sheets-Sheet 1

INVENTOR
Enoch T. Ferngren
BY C. A. Rowley
ATTORNEY

June 1, 1926. 1,586,619
E. T. FERNGREN
METHOD AND APPARATUS FOR SUPPLYING MOLTEN GLASS TO SHEET DRAWING MACHINES
Filed Oct. 12, 1922  2 Sheets-Sheet 2

INVENTOR
Enoch T. Ferngren
BY C. H. Rowley
ATTORNEY

Patented June 1, 1926.

1,586,619

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR SUPPLYING MOLTEN GLASS TO SHEET-DRAWING MACHINES.

Application filed October 12, 1922. Serial No. 593,961.

This invention relates to the art of drawing sheet glass and more particularly to an improved method and apparatus for continuously feeding molten glass in the proper condition to the sheet source.

In previously known forms of apparatus for drawing sheet glass, it has been customary to either draw the sheet from a shallow pot or receptacle, into which the glass flows at one side from a continuous tank furnace or other source of supply, or to draw the sheet directly from the deep body of glass at the cooler end of the supply tank. The most satisfactory results have been obtained by using the shallow draw-pot, but this system has certain disadvantages, such as the necessity for constantly heating the shallow body of glass to maintain same at a working temperature, and the difficulty of maintaining a circulation of glass within the shallow pot, most of the glass passing into the sheet being drawn from the side in open communication with the tank, and there being a tendency for the glass in the closed or dead end of the receptacle to become stagnant. These disadvantages are largely avoided by the use of a large deep body of molten glass from which the sheet is drawn.

The present invention embodies most of the advantages of both systems. A portion of the glass near the surface of the deep pool of glass at the end of a supply tank is so segregated or divided from the main body of glass that it acts in all respects as if it were held in a shallow draw-pot. At the same time this shallow body of glass is practically surrounded by, and is in open communication with the larger body of glass in the tank, so that it is more easily and accurately maintained at a constant and proper temperature. This shallow body of glass is, furthermore, in open communication at both ends with the main body of glass, and as the glass in the shallower body is drawn away into the sheet, the supply will be replenished by molten glass flowing in equally at either side from the main body of glass in the tank.

The specific objects and advantages of the invention will be more clearly understood from the following detailed description of an improved form of apparatus embodying the principles of the invention.

Figure 1:
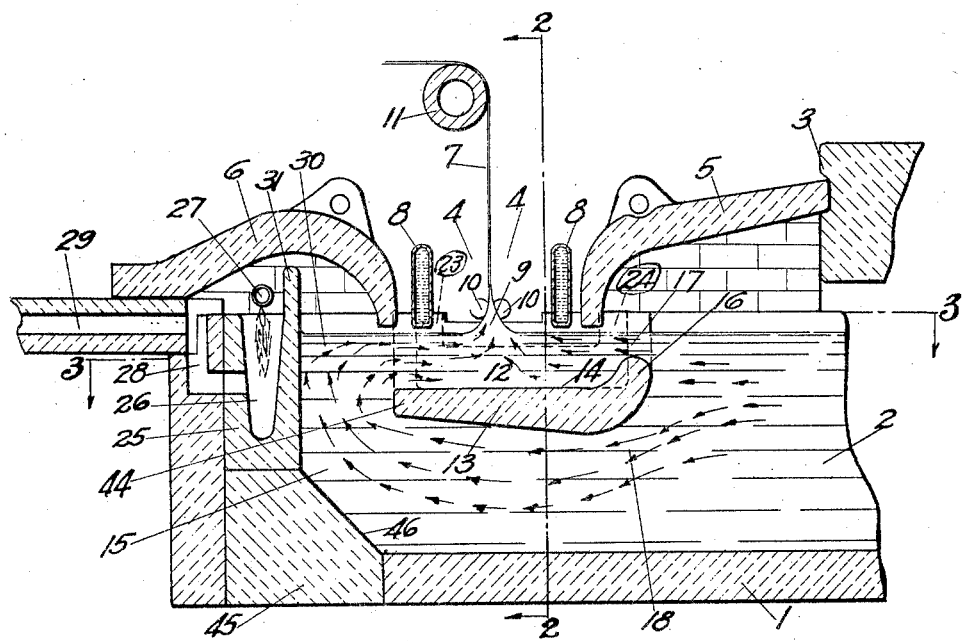
Fig. 1 is a vertical longitudinal section through the end of the supply tank and the adjacent mechanism involved in this invention.
Figure 2:
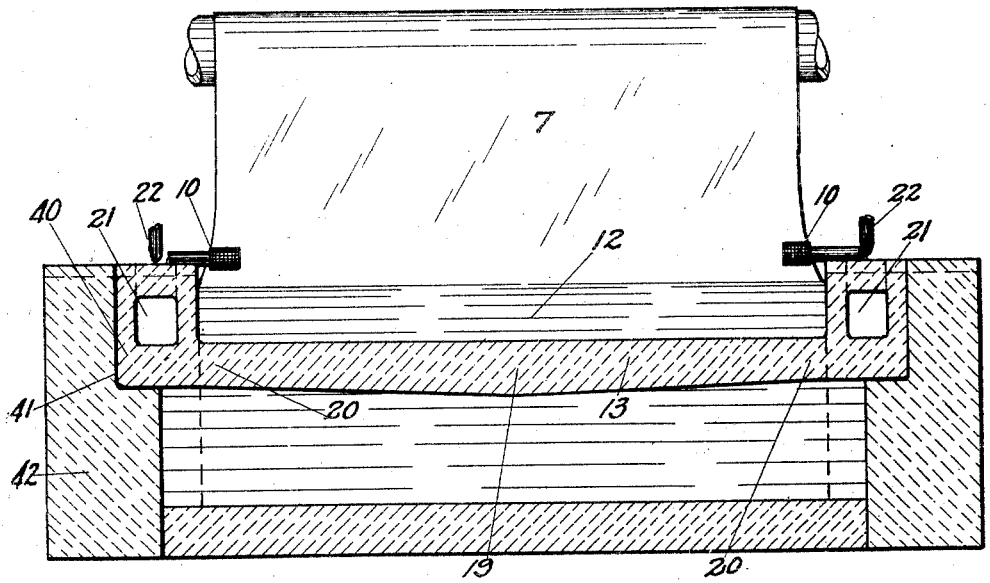
Fig. 2 is a transverse vertical section taken substantially on the line 2—2 of Fig. 1.
Figure 3:
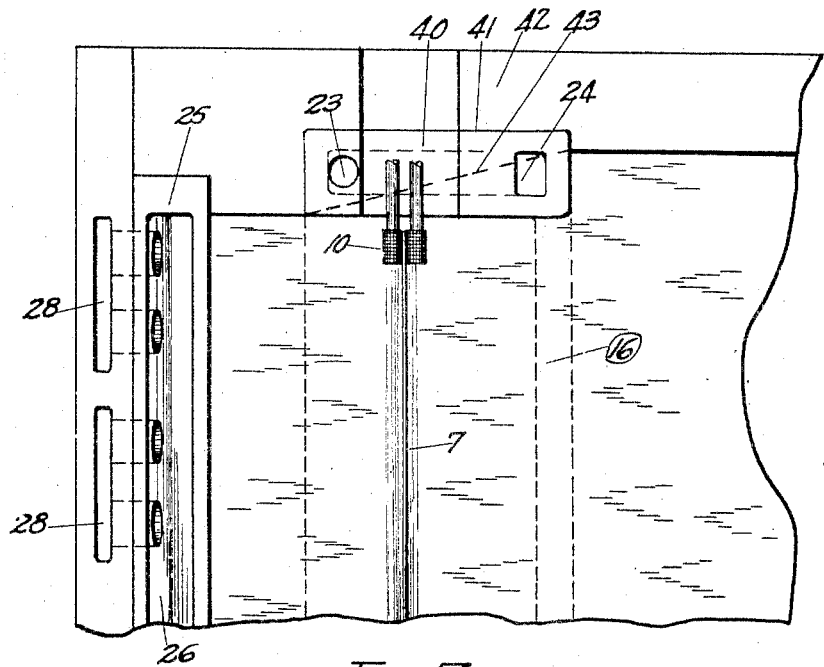
Fig. 3 is a partial plan view of the end of the supply tank with certain of the upper portions of the mechanisms removed to facilitate the disclosure. The view is taken substantially on the line 3—3 of Fig. 1.

Referring first to Figs. 1, 2 and 3, at 1 is indicated the cooler end of a supply tank containing the molten glass 2. It will be understood that this tank is in open communication with the melting tank of a continuous tank furnace, the glass flowing in from this melting tank at the right of Fig. 1. It will be understood that the entire tank is enclosed or arched over as indicated at 3, except for the end portion shown in Fig. 1. This portion is covered, with the exception of a small transverse area at 4, by the lip-tiles 5 and 6. It will be observed that all the glass within the tank is enclosed and maintained in a highly heated condition except the small area 4 between the lip-tiles which is exposed to the open air. It is from this exposed portion that the sheet 7 is drawn. Although many different systems might be employed to draw away this sheet of glass, this apparatus has been especially designed for use with the Colburn system of drawing sheet glass, which is disclosed, for example, in the patent to I. W. Colburn, 1,248,809, granted Dec. 4, 1917. In this system, the sheet is drawn upwardly from a body of cooled plastic surface glass contained in a shallow receptacle or draw-pot. This cooler area of glass is continually provided by the use of water coolers such as indicated at 8 in Fig. 1, which are positioned closely adjacent to the surface of the molten glass at the two sides of the sheet source 9. The sheet is drawn upwardly between pairs of edge-holding rolls 10, bent horizontally over a cooled bending roll 11, and drawn away in the horizontal plane, all as more particularly described in the patent referred to.

In the present invention the cooler area of surface glass 12 from which the sheet is drawn, instead of being contained in a shallow draw-pot, as in the patent, is a portion of the main body of molten glass 2 in the tank 1. However, this cooler glass 12 is separated or segregated from the main body of glass by a refractory division plate 13, positioned transversely of the tank a few inches below the surface of the glass, so that the body of glass 12 thereabove is located in all respects as if it were contained in a shallow receptacle or drawpot. The end portions 40 of plate 13 are upturned to extend above the glass level, and are preferably supported in the recesses 41 in the sides 42 of the tank 1. The upper surface 14 of the plate 13 is substantially flat and is positioned parallel to and a few inches below the surface of the molten pool. This surface 14 is, preferably, substantially coextensive with the area of exposed surface glass between the lip-tiles 5 and 6. It will be noted that this body of cooler glass above the plate 13 is in open communication at either side with the main body of glass 2 in the tank 1, and as the cooler glass is drawn away at 9 into the sheet 7, this supply of cooler glass 12 is replenished by molten glass flowing in at both sides from the supplying 2, as indicated by the arrows in Fig. 1. The molten glass 15 at the closed end of the tank flows from the melting tank beneath the plate 13 and up around the plate 13 to the sheet source 9, also as indicated by the arrows in Fig. 1.

In the form of the apparatus indicated in Figs. 1, 2 and 3, the plate 13 is provided at its edge adjacent to the melting tank with an upwardly projecting flange or ridge 16. The purpose of this ridge is to somewhat restrict the flow of glass 17 above the plate 13 from this side, and enforce a greater flow of glass 18 below the plate to the closed end of the tank. This ridge may, in some cases, be necessary to secure an absolutely equal flow of glass above the plate from both sides thereof. It will also be noted that the plate 13 is made thicker at the center as indicated at 19 than at the ends 20. Since the flowing molten glass will be somewhat cooled and retarded near the sides of the pot, the thicker central portion of plate 13 is provided to form an additional obstruction to the flow of the molten glass at this point. The result is a more even or uniform flow across the entire width of the tank. Since the presence of the refractory member 13 within the molten glass will have a certain chilling effect on the glass, the ends 40 of this plate 13, where this chilling effect would be the greatest, are shown in Figs. 1 to 3, as provided with interior heating chambers 21 for raising the temperatures of the refractory member and surrounding glass at these places, to avoid this undue chilling. The chambers 21 are preferably heated by means of burners 22, which are directed into one end 23 of the heating chamber, the heated gases being drawn out at 24 in any suitable manner. Of course, other forms of heating means, such as enclosed electric heaters, might be used.

It will be noted in Fig. 1, that the side walls 42 of the tank taper inwardly as at 43 toward the closed end of the tank, beneath plate 13. Also, the plate 13 is thinner or tapers upwardly as at 44 toward the closed end of the tank. Also, the lower end block 45 of the tank is beveled upwardly as at 46. All of these features tend to facilitate and direct the flow of molten glass beneath plate 13 to the closed end of the tank.

In order to avoid undue cooling of the molten glass 15 at the closed end of tank 1, heating means are provided at this end of the tank to maintain the glass at the proper temperature. The inner block 25 at the end of the tank is hollowed out, as shown at 26 to provide a heating chamber. Burners 27 direct their heat into this chamber, the gases passing out through the flue passages 28 and 29. In order to shield the surface of the molten glass 30 adjacent this closed end of the tank from soot or dirt that might be deposited from the heating chamber 26, the adjacent wall of block 25 is extended upwardly as shown at 31. Sufficient heat will pass over the top of the shield 31 beneath lip-tile 6 to maintain the surface glass at this end of the tank at a proper temperature.

Figure 4:
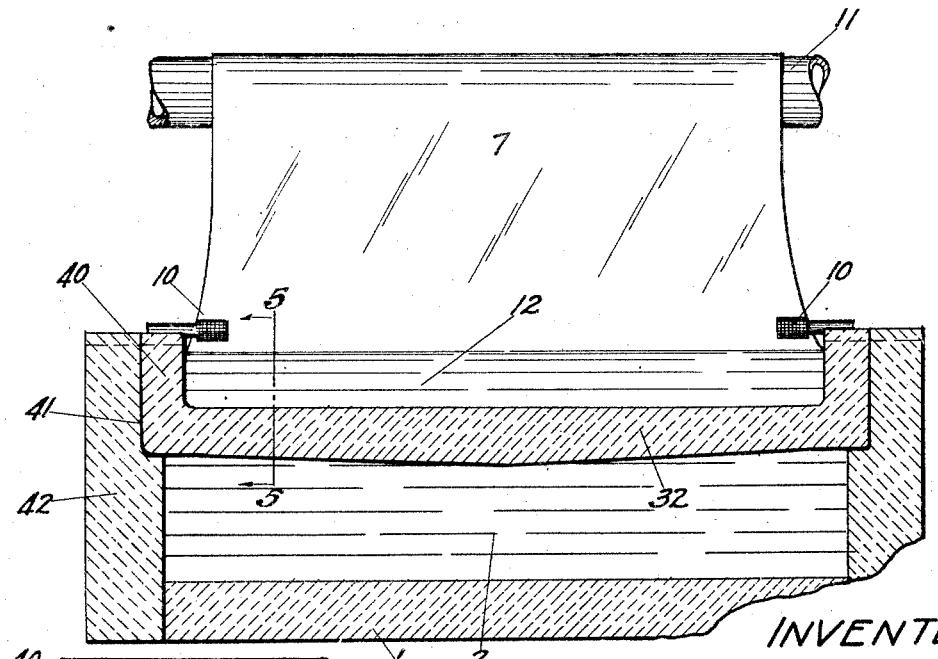
Fig. 4 is a view similar to Fig. 2, showing a modified form of division plate.
Figure 5:
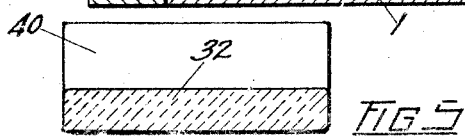
Fig. 5 is a transverse cross-section through this form of plate, taken substantially on the line 5—5 of Fig. 4.

In the modified or simpler form of division plate 32 shown in Figs. 4 and 5, the heating chambers 21 at the ends of the plate, and the obstructing ridge 16 at the furnace side of the plate are omitted. This plate 32 is of substantially rectangular cross-section, as shown in Fig. 5, and forms the bottom of a pot or container for the cooled glass 12 open equally at both ends to the supply of molten glass 2 in tank 1. This simpler form of plate will be found quite satisfactory in most cases, although the refinements already described in connection with plate 13 may be added to obtain the best results.

In operation, the sheet of glass 7 is continuously drawn away at the sheet source 9 from the chilled body of surface glass 12 above the plate 13 (or 32). As this chilled glass is drawn away more molten glass will flow in above the plate 13, and become chilled by the coolers 8. It will be noted that the body of glass 12 is of the same shape and volume as if it were contained in a shallow draw-pot. At the same time, however, this smaller body of glass 12 is practically surrounded by the larger body of hot glass 2, which is much more easily maintained at a constant temperature than the smaller body of glass 12 would be if isolated in a shallow pot. Also the flow of glass 18 beneath the plate 13 to the far end of the tank is easily and naturally enforced in this form of apparatus and the cooled glass will be drawn into the sheet uniformly from both sides since the supply is replenished equally by glass flowing in from both sides of the plate 13.

Claims:

1. In an apparatus for drawing sheet glass, wherein the sheet is drawn upwardly from a rather deep pool of molten glass, means for segregating a shallow body of the molten glass below and adjacent the sheet source, comprising a submerged refractory plate with its upper surface substantially parallel with the surface of the pool, the plate having a substantially flat upper surface but being thicker at the center than adjacent the sides of the pool, for the purpose described.

2. In an apparatus for drawing sheet glass, wherein the sheet is drawn upwardly from a rather deep pool of molten glass, means for segregating a shallow body of the molten glass below and adjacent the sheet source, comprising a submerged refractory plate with its upper surface substantially parallel with the surface of the pool, the plate having a substantially flat upper surface but being thicker at the center than adjacent the sides of the pool, for the purpose described, and means for heating the ends of the plate.

3. In an apparatus for drawing sheet glass, wherein the sheet is drawn upwardly from a rather deep pool of molten glass, means for segregating a shallow body of the molten glass below and adjacent the sheet source, comprising a submerged refractory plate with its upper surface substantially parallel with the surface of the pool, the plate having a substantially flat upper surface but being thicker at the center than adjacent the sides of the pool, for the purpose described, and heating chambers contained within the ends of the plate.

4. In an apparatus for drawing sheet glass, wherein the sheet is drawn upwardly from a rather deep pool of molten glass, means for segregating a shallow body of the molten glass below and adjacent the sheet source, comprising a submerged refractory plate with its upper surface substantially parallel with the surface of the pool, and means for heating the ends of the plate.

5. In an apparatus for drawing sheet glass, wherein the sheet is drawn upwardly from a rather deep pool of molten glass, means for cooling an area of the pool surface at both sides of the sheet source, and a refractory plate submerged below the pool surface with its upper face substantially parallel to and coextensive with the cooled surface area.

6. In an apparatus for drawing sheet glass, wherein the sheet is drawn upwardly from a rather deep pool of molten glass, means for cooling an area of the pool surface at both sides of the sheet source, and a refractory plate submerged below the pool surface with its upper face substantially parallel to and coextensive with the cooled surface area, the plate having a substantially flat upper surface but being thicker at the center than adjacent the sides of the pool, for the purpose described.

7. In an apparatus for drawing sheet glass, the combination with a tank containing a pool of molten glass, and the mechanism for drawing a sheet of glass therefrom, of a refractory plate submerged below the surface of the pool, with its upper face substantially parallel with the surface of the pool to segregate a shallow body of glass from which the sheet is drawn, the ends of the plate being supported from the sides of the tank, and means for heating the ends of the plate.

8. In an apparatus for drawing sheet glass, the combination with a tank containing a pool of molten glass, and the mechanism for drawing a sheet of glass therefrom, of a refractory plate submerged below the surface of the pool, with its upper face substantially parallel with the surface of the pool to segregate a shallow body of glass from which the sheet is drawn, the ends of the plate being supported from the sides of the tank, and heating chambers contained within the ends of the plate.

9. In an apparatus for drawing sheet glass, the combination with a tank containing a pool of molten glass, a transverse area of the upper surface of the pool being exposed, the remainder of the pool surface being enclosed, a machine for drawing a sheet of glass upwardly from the exposed portion of the pool, of a refractory plate submerged below the pool surface, with its upper face substantially parallel to and coextensive with the exposed area, and means for cooling the exposed area of glass at the sides of the sheet source.

10. In an apparatus for drawing sheet glass, the combination with a tank containing a pool of molten glass, the tank being in open communication at one end with a supply of molten glass and closed at the other end, a transverse area of the upper surface of the pool adjacent to but spaced from the closed end of the tank being exposed, and the remainder of the pool surface being enclosed, and a machine for drawing a sheet of glass upwardly from the exposed surface of the pool, of a refractory plate submerged below the pool surface, with its upper face substantially parallel to and coextensive with the exposed area, the plate having a substantially flat upper surface but being thicker at the center than at the ends adjacent the sides of the tank, for the purpose described.

11. The method of producing uniformly temperatured glass at the drawing point of a supply, which consists in submerging a refractory member of principally flat extent below the surface of the glass supply, and forming a partly enclosed pool of suitable depth and extent at the point where the sheet is drawn, in causing a flow of the surrounding supply into said pool during the drawing of the sheet in a manner to restrict flow movement into the pool from that side of the supply where the glass is of high temperature and promote movement from that side where the temperature is lower, in cooling the surface layer of the glass of the pool adjacent the point of sheet emergence, and maintaining an unobstructed surface movement from the surrounding supply toward and over the pool area.

Signed at Toledo, in the county of Lucas, and State of Ohio, this 9th day of October, 1922.

ENOCH T. FERNGREN.